United States Patent
Park et al.

(10) Patent No.: US 10,697,523 B2
(45) Date of Patent: Jun. 30, 2020

(54) PLANETARY GEAR TRAIN OF AUTOMATIC TRANSMISSION FOR VEHICLE

(71) Applicants: HYUNDAI MOTOR COMPANY, Seoul (KR); KIA MOTORS CORPORATION, Seoul (KR)

(72) Inventors: Juhyeon Park, Suwon-si (KR); Seongwook Ji, Gunpo-si (KR); Hyun Sik Kwon, Seoul (KR); Ilhan Yoo, Jeollanam-do (KR); Seong Wook Hwang, Gunpo-si (KR); Ki Tae Kim, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 14 days.

(21) Appl. No.: 16/174,541

(22) Filed: Oct. 30, 2018

(65) Prior Publication Data

US 2019/0390744 A1    Dec. 26, 2019

(30) Foreign Application Priority Data

Jun. 26, 2018    (KR) .......................... 10-2018-0073406

(51) Int. Cl.
*F16H 3/66* (2006.01)
*F16H 3/44* (2006.01)

(52) U.S. Cl.
CPC .......... *F16H 3/66* (2013.01); *F16H 2003/445* (2013.01); *F16H 2200/0047* (2013.01); *F16H 2200/0056* (2013.01); *F16H 2200/2007* (2013.01); *F16H 2200/2041* (2013.01); *F16H 2200/2043* (2013.01); *F16H 2200/2046* (2013.01)

(58) Field of Classification Search
None
See application file for complete search history.

(56) References Cited

U.S. PATENT DOCUMENTS

| 8,414,442 B2 * | 4/2013 | Seo | F16H 3/666 475/218 |
| 8,758,188 B2 * | 6/2014 | Lee | F16H 3/44 475/280 |
| 8,905,882 B2 * | 12/2014 | Lee | B60K 6/365 180/65.26 |

(Continued)

*Primary Examiner* — Dirk Wright
(74) *Attorney, Agent, or Firm* — Brinks Gilson & Lione

(57) ABSTRACT

A planetary gear train of an automatic transmission for a vehicle may include: an input shaft; an output shaft disposed in parallel with the input shaft; a first planetary gear set having first, second, and third rotation elements; a second planetary gear set having fourth, fifth, and sixth rotation elements; a first shaft fixedly connected to the first rotation element and selectively connected to the input shaft and a transmission housing; a second shaft fixedly connected to the second rotation element; a third shaft fixedly connected to the third rotation element; a fourth shaft selectively connected to the input shaft; a fifth shaft fixedly connected to the fourth rotation element and fixedly connected to the output shaft; a sixth shaft fixedly connected to the fifth rotation element; and a seventh shaft fixedly connected to the sixth rotation element, selectively connected to the fifth shaft.

10 Claims, 6 Drawing Sheets

(56) References Cited

U.S. PATENT DOCUMENTS

| | | | | |
|---|---|---|---|---|
| 8,905,889 B2* | 12/2014 | Lee | ............................ | F16H 3/66 |
| | | | | 475/271 |
| 9,090,155 B2* | 7/2015 | Lee | ........................ | B60K 6/387 |
| 9,103,415 B2* | 8/2015 | Shim | .......................... | F16H 3/66 |
| 9,175,749 B2* | 11/2015 | Noh | ........................... | F16H 3/62 |
| 9,702,437 B2* | 7/2017 | Lee | ............................ | F16H 3/46 |
| 9,783,039 B2* | 10/2017 | Hwang | .................. | B60K 6/365 |
| 10,557,528 B2* | 2/2020 | Hwang | .................. | B60K 6/383 |

\* cited by examiner

FIG. 2

| speed stages | C1 | C2 | C3 | B1 |
|:---:|:---:|:---:|:---:|:---:|
| D1 | ● | ● | | |
| D2 | | ● | | ● |
| D3 | | ● | ● | |
| D4 | | | ● | ● |
| D5 | ● | | ● | |

FIG. 4

| speed stages | C1 | C2 | C3 | C4 | B1 |
|---|---|---|---|---|---|
| D1 | ● | ● |  | ● |  |
| D2 |  | ● |  | ● | ● |
| D3 |  | ● | ● |  | ● |
| D4 |  |  | ● | ● | ● |
| D5 | ● |  | ● | ● |  |

FIG. 6

| speed stages | C1 | C2 | C3 | C4 | B1 | B2 |
|---|---|---|---|---|---|---|
| D1 | ● | ● |  | ● |  |  |
| D2 |  | ● |  | ● | ● |  |
| D3 |  | ● | ● |  | ● |  |
| D4 |  |  | ● | ● | ● |  |
| D5 | ● |  | ● | ● |  |  |
| D6 |  |  | ● |  | ● | ● |
| D7 | ● |  | ● |  |  | ● |
| REV | ● | ● |  |  |  | ● |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2018-0073406, filed on Jun. 26, 2018, the entire contents of which are incorporated herein by reference.

FIELD

The present disclosure relates to an automatic transmission for a vehicle. More particularly, the present disclosure relates to a planetary gear train of an automatic transmission for a vehicle that improves power delivery performance and fuel efficiency.

BACKGROUND

The statements in this section merely provide background information related to the present disclosure and may not constitute prior art.

Generally, an automatic transmission achieving more speed stages has been developed to improve fuel economy and drivability. Recently, increased oil price is triggering more competition in enhancing fuel efficiency of a vehicle.

Therefore, many researches for reducing weight and enhancing fuel economy in the auto industry through downsizing of an engine, and researches for securing drivability and fuel economy through multiple speed stages of automatic transmissions have been conducted.

However, in the automatic transmissions, the number of internal components (particularly, planetary gear sets etc.) increases so as to increase the number of speed stages, and as a result, a length of the transmission increases. Therefore, mountability, cost, weight, transmission efficiency, and the like are undermined.

In this aspect, in recent years, a hybrid transmission using motors has been used as the automatic transmission, and installability to the vehicle has been improved.

Particularly, a conventional 8-speed automatic transmission typically includes three to four planetary gear sets and five to seven engagement elements (frictional elements). In this case, since the length of the automatic transmission increases, installability may be deteriorated.

SUMMARY

The present disclosure provides a planetary gear train of an automatic transmission for a vehicle having advantages of achieving more than five forward speed stages by dividedly disposing two planetary gear sets, two external gears and more than four engagement elements on an input shaft and an output shaft disposed in parallel with the input shaft, and by connecting rotation elements of the two planetary gear sets through the two external gears and the more than four engagement elements. Therefore, a hybrid transmission may be easily implemented, power delivery performance and fuel economy may be improved due to multi-speed stages, and installability may be improved by shortening a length of the automatic transmission.

In addition, the present disclosure has been made in an effort to provide a planetary gear train of an automatic transmission for a vehicle having further advantages of enabling of setting optimum gear ratios due to ease of changing gear ratios of transfer gear sets, and accordingly improving power delivery performance and fuel economy.

A planetary gear train of an automatic transmission for a vehicle according to an exemplary form of the present disclosure may include: an input shaft receiving torque of an engine; an output shaft outputting torque and disposed in parallel with the input shaft; a first planetary gear set having first, second, and third rotation elements and disposed on a radially outer side of the input shaft; a second planetary gear set having fourth, fifth, and sixth rotation elements and disposed on a radially outer side of the output shaft; a first shaft fixedly connected to the first rotation element and selectively connected to the input shaft and a transmission housing respectively; a second shaft fixedly connected to the second rotation element and operably connected to the input shaft; a third shaft fixedly connected to the third rotation element; a fourth shaft selectively connected to the input shaft; a fifth shaft fixedly connected to the fourth rotation element and fixedly connected to the output shaft; a sixth shaft fixedly connected to the fifth rotation element and operably connected to the fourth shaft; and a seventh shaft fixedly connected to the sixth rotation element, selectively connected to the fifth shaft, and operably connected to the third shaft.

The planetary gear train may further include: a first transfer gear set disposed between the third shaft and the seventh shaft and operably connecting the third shaft to the seventh shaft; and a second transfer gear set disposed between the fourth shaft and the sixth shaft and operably connecting the fourth shaft to the sixth shaft.

In one aspect, the second shaft may be fixedly connected to the input shaft.

The planetary gear train may further include: three clutches, each selectively connecting one shaft to another shaft selected among the input shaft and the seven shafts; and a first brake selectively connecting the first shaft to the transmission housing.

The three clutches may include: a first clutch disposed between the input shaft and the first shaft; a second clutch disposed between the fifth shaft and the seventh shaft; and a third clutch disposed between the input shaft and the fourth shaft.

In another aspect, the second shaft may be selectively connected to the input shaft.

The planetary gear train may further include: four clutches, each selectively connecting one shaft to another shaft selected among the input shaft and the seven shafts; and a first brake selectively connecting the first shaft to the transmission housing.

The four clutches may include: a first clutch disposed between the input shaft and the first shaft; a second clutch disposed between the fifth shaft and the seventh shaft; a third clutch disposed between the input shaft and the fourth shaft; and a fourth clutch disposed between the input shaft and the second shaft.

In further aspect, the planetary gear train may further include a second brake disposed between the second shaft and the transmission housing.

The first planetary gear set may be a single pinion planetary gear, wherein the first rotation element is a first sun gear, the second rotation element is a first planet carrier, and the third rotation element is a first ring gear.

The second planetary gear set may be a single pinion planetary gear, wherein the fourth rotation element is a second sun gear, the fifth rotation element is a second planet carrier, and the sixth rotation element is a second ring gear.

A planetary gear train according to exemplary forms of the present disclosure reduces a length of an automatic transmission and thereby improves installability by dividedly disposing two planetary gear sets on an input shaft and an output shaft disposed in parallel with and spaced from each other.

In addition, optimum gear ratios may be set due to ease of changing gear ratios of two transfer gear sets as well as the planetary gear sets. Since gear ratios can be changed according to target performance, starting performance may be improved. Therefore, a start-up clutch instead of a torque converter may be used.

In addition, the planetary gear train according to the exemplary forms of the present disclosure may improve power delivery performance and fuel economy by achieving more than five forward speed stages.

Other effects obtainable or predictable from the exemplary forms of the present disclosure will be explicitly or implicitly described in a DETAILED DESCRIPTION section. That is, various effects predictable from the exemplary forms of the present disclosure will be described in the DETAILED DESCRIPTION section.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is an operation chart of engagement elements at each speed stage in the planetary gear train according to the first exemplary form of the present disclosure;

FIG. 4 is an operation chart of engagement elements at each speed stage in the planetary gear train according to the second exemplary form of the present disclosure;

FIG. 6 is an operation chart of engagement elements at each speed stage in the planetary gear train according to the third exemplary form of the present disclosure.

Figure 1:
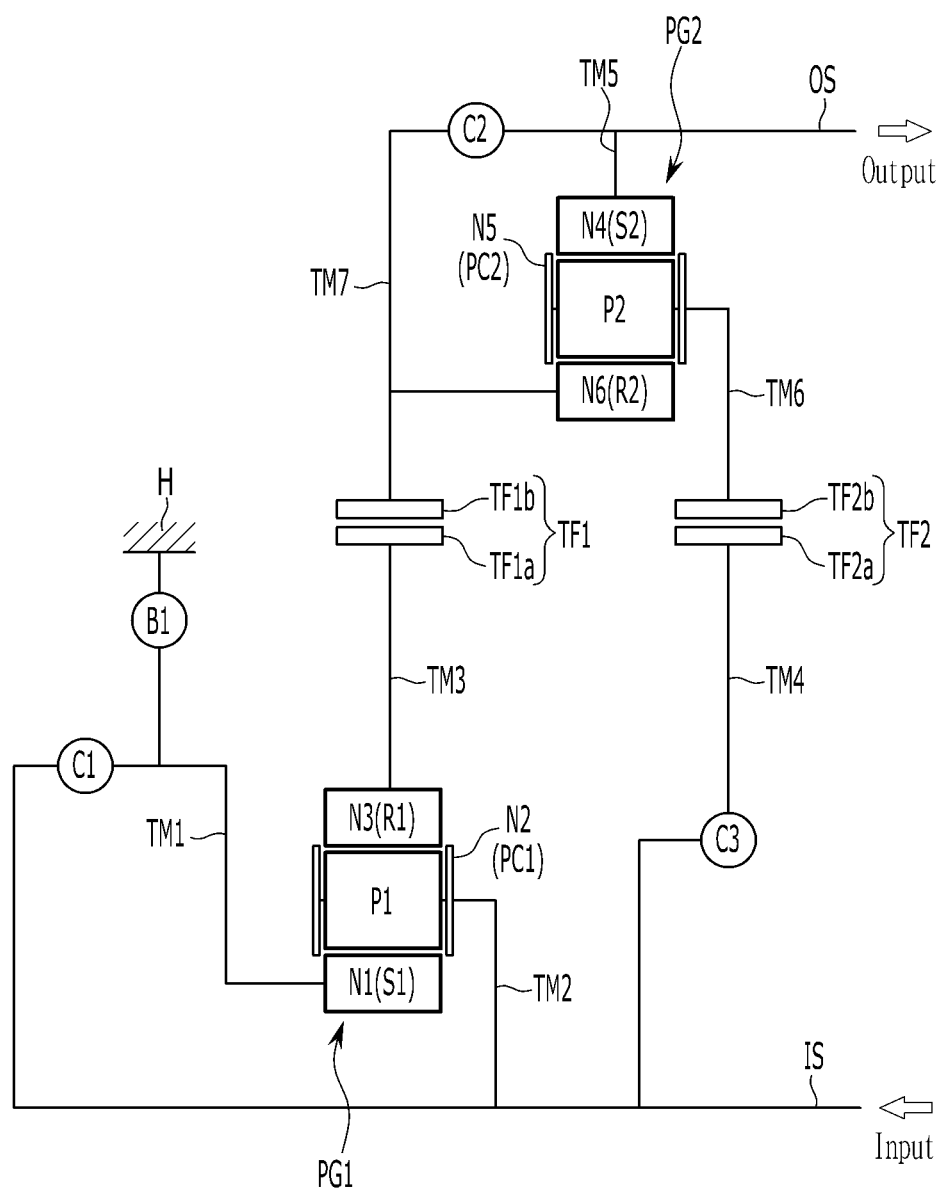
FIG. 1 is a schematic diagram of a planetary gear train according to the first exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

However, parts which are not related with the description are omitted for clearly describing the exemplary forms of the present disclosure.

In the following description, dividing names of components into first, second, and the like is to divide the names because the names of the components are the same as each other and an order thereof is not particularly limited.

FIG. 1 is a schematic diagram of a planetary gear train according to the first exemplary form of the present disclosure.

Referring to FIG. 1, a planetary gear train according to a first exemplary form of the present disclosure includes an input shaft IS, an output shaft OS, first and second planetary gear sets PG1 and PG2, two transfer gear sets TF1 and TF2, and engagement elements including three clutches C1, C2, and C3 and one brake B1.

The input shaft IS is an input member and torque from a crankshaft of the engine is torque-converted through a torque converter to be input into the input shaft IS.

The output shaft OS is an output member, is disposed in parallel with and spaced from the input shaft IS, and transmits driving torque to a driving wheel through a differential apparatus.

The first planetary gear set PG1 is disposed at a radial outer side of the input shaft IS, and the second planetary gear set PG2 is disposed at a radial outer side of the output shaft OS.

The first planetary gear set PG1 is a single pinion planetary gear set and includes a first sun gear S1 of a first rotation element N1, a first planet carrier PC1 of a second rotation element N2 rotatably supporting a plurality of first pinion gears P1 engaged with the first sun gear S1, and a first ring gear R1 of a third rotation element N3 engaged with the plurality of first pinion gears P1 and operably connected with the first sun gear S1.

The second planetary gear set PG2 is a single pinion planetary gear set and includes a second sun gear S2 of a fourth rotation element N4, a second planet carrier PC2 of a fifth rotation element N5 rotatably supporting a plurality of second pinion gears P2 evenly disposed on and externally engaged with an exterior circumference the second sun gear S2, and a second ring gear R2 of a sixth rotation element N6 internally engaged with the plurality of second pinion gears P2 and operably connected with the second sun gear S2.

Here, the term "operably connected" or the like means at least two members are directly or indirectly connected with each other. However, two members that are operably connected with each other do not always rotate with the same rotational speed and in the same rotation direction.

Here, each of the first to sixth rotation elements N1 to N6 of the first and second planetary gear sets PG1 and PG2 and the input shaft is connected to at least one of seven shafts TM1 to TM7.

That is, the six rotation elements N1 to N6, the input shaft IS, and the output shaft OS are selectively connected to each other through the seven shafts TM1 to TM7, the three clutches C1 to C3, the one brake B1, and the two transfer gear sets TF1 and TF2 to achieve five forward speed stages.

The seven shafts TM1 to TM7 will be described in detail.

The first shaft TM1 is fixedly connected to the first rotation element N1 (first sun gear S1), is selectively connected to the input shaft IS to be operated as a selective input element, and is selectively connected to a transmission housing H to be operated as a selective fixed element.

The second shaft TM2 is fixedly connected to the second rotation element N2 (first planet carrier PC1) and is fixedly connected to the input shaft IS to be continuously operated as an input element.

The third shaft TM3 is fixedly connected to the third rotation element N3 (first ring gear R1).

The fourth shaft TM4 is selectively connected to the input shaft IS to be operated as a selective input element.

The fifth shaft TM5 is fixedly connected to the fourth rotation element N4 (second sun gear S2) and is fixedly connected to the output shaft OS to be continuously operated as an output element.

The sixth shaft TM6 is fixedly connected to the fifth rotation element N5 (second planet carrier PC2) and is operably connected to the fourth shaft TM4 through the second transfer gear set TF2.

The seventh shaft TM7 is fixedly connected to the sixth rotation element N6 (second ring gear R2), is selectively connected to the fifth shaft TM5, and is operably connected to the third shaft TM3 through the first transfer gear set TF1.

The seven shafts TM1 to TM7 fixedly connect rotation elements selected among the rotation elements of the planetary gear sets (PG1 and PG2) with each other, and the seven shafts are rotation members that are connected to any one rotation element and rotate with the any one rotation element to transmit torque, are rotation members that selectively connects any one rotation element with the transmission housing H, or are fixing members that fixedly connect any one rotation element to the transmission housing H.

Here, the term "fixedly connected" or the like means at least two members are connected to each other to always rotate without rotational speed difference. That is, at least two members that are fixedly connected to each other always rotate with the same rotational speed and in the same rotation direction. Therefore, it is to be understood by a person of an ordinary skill in the art that the term "fixedly connected" or the like differs the term "operably connected" or the like.

Here, the term "selectively connected" or the like means a plurality of shafts including the input shaft and the output shaft are connectable to each other through at least one of the engagement elements to rotate with the same rotational speed and in the same rotation direction, or are connectable to the transmission housing through at least one of the engagement elements to be fixed to the transmission housing.

In other words, in a case that the engagement element selectively connects a plurality of shafts to each other, the plurality of shafts rotate with the same rotational speed and in the same rotation direction when the engagement element operates but the plurality of shafts are disconnected from each other when the engagement element is released.

In addition, in a case that the engagement element selectively connects any one shaft to the transmission housing, the corresponding shaft is fixedly connected to the transmission housing when the engagement element operates but the corresponding shaft is rotatable when the engagement element is released.

Each of the three clutches C1, C2, and C3 is disposed at a portion at which any two shafts among the seven shafts TM1 to TM7 and the input shaft IS are selectively connected to each other.

In addition, the brake B1 is disposed at a portion at which one shaft among the seven shafts TM1 to TM7 is selectively connected to the transmission housing H.

Arrangement of the three clutches C1 to C3 and the one brake B1 will be described in detail.

The first clutch C1 is disposed between the input shaft IS and the first shaft TM1 (first rotation element N1) and selectively connects the input shaft IS to the first shaft TM1.

The second clutch C2 is disposed between the fifth shaft TM5 (fourth rotation element TM4) and the seventh shaft TM7 (sixth rotation element N6) and selectively connects the fifth shaft TM5 to the seventh shaft TM7. If the second clutch C2 is operated, the second planetary gear set PG2 becomes a lock-up state.

The third clutch C3 is disposed between the fourth shaft TM4 and the input shaft IS and selectively connects the fourth shaft TM4 to the input shaft IS.

The first brake B1 is disposed between the first shaft TM1 (first rotation element N1) and the transmission housing H and selectively connects and fixes the first shaft TM1 to the transmission housing H.

The engagement elements including the first, second, and third clutches C1, C2, and C3 and the first brake B1 may be multi-plates friction elements of wet type that are operated by hydraulic pressure. Multi-plates friction elements of wet type are mainly used as the engagement elements, but dog clutches, electric clutches, or magnetic clutches that can be operated by electric signal from an electric control unit can be used as the engagement elements.

Each of the two transfer gear sets TF1 and TF2 is disposed at a portion at which one shaft is operably connected to another shaft.

The first transfer gear set TF1 includes a first transfer drive gear TF1a connected to the third shaft TM3 (third rotation element N3) and a first transfer driven gear TF1b connected to the seventh shaft TM7 (sixth rotation element N6), and operably connects the third shaft TM3 to the seventh shaft TM7.

The second transfer gear set TF2 includes a second transfer drive gear TF2a connected to the fourth shaft TM4 and a second transfer driven gear TF2b connected to the sixth shaft TM6 (fifth rotation element N5), and operably connects the fourth shaft TM4 to the sixth shaft TM6.

Any two shafts connected to each other through each of the first and second transfer gear sets TF1 and TF2 rotate in opposite direction. Gear ratios of the first and second transfer gear sets TF1 and TF2 are set according to speed ratios demanded by the transmission. The gear ratios of the first and second transfer gear sets TF1 and TF2 are different from each other in the first exemplary form of the present disclosure.

Figure 2:
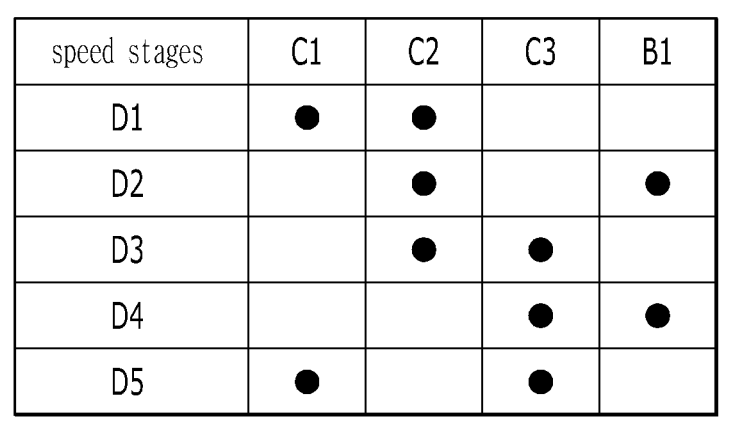

FIG. 2 is an operation chart of engagement elements at each speed stage in the planetary gear train according to the first exemplary form of the present disclosure.

Referring to FIG. 2, two engagement elements among the first, second, and third clutches C1, C2, and C3 and the first brake B1 are operated at each speed stage in the planetary gear train according to the first exemplary form of the present disclosure. The planetary gear train according to the first exemplary form of the present disclosure can achieve five forward speed stages. Shifting processes will be described.

First Forward Speed Stage

The first and second clutches C1 and C2 are operated at a first forward speed stage D1.

In a state that the input shaft IS is connected to the first shaft TM1 by operation of the first clutch C1, torque of the input shaft IS is input to the first shaft TM1 and the second shaft TM2. Therefore, the first planetary gear set PG1 becomes a lock-up state.

In addition, the fifth shaft TM5 is connected to the seventh shaft TM7 by operation of the second clutch C2 such that the second planetary gear set PG2 also becomes the lock-up state.

Torque of the third shaft TM3 of the first planetary gear set PG1 is converted according to the gear ratio of the first transfer gear set TF1, and the converted torque is input to the seventh shaft TM7 as inverse rotation speed. The second planetary gear set PG2 outputs the torque input through the seventh shaft TM7 through the output shaft OS without rotation speed change. Therefore, the vehicle can run at the first forward speed stage.

Second Forward Speed Stage

The second clutch C2 and the first brake B1 are operated at a second forward speed stage D2.

In a state that the first shaft TM1 is operated as the fixed element by operation of the first brake B1, the torque of the input shaft IS is input to the second shaft TM2. Therefore, the first planetary gear set PG1 outputs torque with increased rotation speed through the third shaft TM3.

In addition, the fifth shaft TM5 is connected to the seventh shaft TM7 by operation of the second clutch C2 such that the second planetary gear set PG2 also becomes the lock-up state.

The torque with increased rotation speed output through the third shaft TM3 of the first planetary gear set PG1 is converted according to the gear ratio of the first transfer gear set TF1, and the converted torque is input to the seventh shaft TM7 as inverse rotation speed. The second planetary gear set PG2 outputs the torque input through the seventh shaft TM7 through the output shaft OS without rotation speed change. Therefore, the vehicle can run at the second forward speed stage with a speed faster than at the first forward speed stage.

Third Forward Speed Stage

The second and third clutches C2 and C3 are operated at a third forward speed stage D3.

In a state that the input shaft IS is connected to the fourth shaft TM4 by operation of the third clutch C3, the torque of the input shaft IS is input to the second shaft TM2 and the fourth shaft TM4.

In addition, the fifth shaft TM5 is connected to the seventh shaft TM7 by operation of the second clutch C2 such that the second planetary gear set PG2 also becomes the lock-up state.

The torque of the fourth shaft TM4 is converted according to the gear ratio of the second transfer gear set TF2, and the converted torque is input to the sixth shaft TM6 as inverse rotation speed. The second planetary gear set PG2 outputs the torque input through the sixth shaft TM6 through the output shaft OS without rotation speed change. At this state, rotation speed of the torque of the fourth shaft TM4 converted by the second transfer gear set TF2 at the third forward speed stage is larger than that of the torque of the third shaft TM3 converted by the first transfer gear set TF1 at the second forward speed stage. Therefore, the vehicle can run at the third forward speed stage with a speed faster than at the second forward speed stage.

Meanwhile, though the torque of the input shaft IS is input to the second shaft TM2 of the first planetary gear set PG1, the torque of the second shaft TM2 does not affect the third forward speed stage. The first shaft TM1 runs idle due to rotation speed difference between the torque transmitted to the third shaft TM3 through the seventh shaft TM7 and the torque of the input shaft IS input to the second shaft TM2.

Fourth Forward Speed Stage

The third clutch C3 and the first brake B1 are operated at a fourth forward speed stage D4.

In a state that the first shaft TM1 is operated as the fixed element by operation of the first brake B1, the torque of the input shaft IS is input to the second shaft TM2. Therefore, the first planetary gear set PG1 outputs the torque with increased rotation speed through the third shaft TM3.

In a state that the input shaft IS is connected to the fourth shaft TM4 by operation of the third clutch C3, the torque of the input shaft IS is input to the second shaft TM2 and the fourth shaft TM4.

The torque with increased rotation speed output through the third shaft TM3 of the first planetary gear set PG1 is converted according to the gear ratio of the first transfer gear set TF1, and the converted torque is input to the seventh shaft TM7 as inverse rotation speed. In addition, the torque of the fourth shaft TM4 is converted according to the gear ratio of the second transfer gear set TF2, and the converted torque is input to the sixth shaft TM6 as inverse rotation speed.

Therefore, the second planetary gear set PG2 outputs torque shifted by a difference between rotation speed of the seventh shaft TM7 and rotation speed of the sixth shaft TM6 through the fifth shaft TM5. Therefore, the vehicle can run at the fourth forward speed stage.

Fifth Forward Speed Stage

The first and third clutches C1 and C3 are operated at a fifth forward speed stage D5.

In a state that the input shaft IS is connected to the first shaft TM1 by operation of the first clutch C1, the torque of the input shaft IS is input to the first shaft TM1 and the second shaft TM2. Therefore, the first planetary gear set PG1 becomes the lock-up state.

In a state that the input shaft IS is connected to the fourth shaft TM4 by operation of the third clutch C3, the torque of the input shaft IS is input to the second shaft TM2 and the fourth shaft TM4.

The torque with increased rotation speed output through the third shaft TM3 of the first planetary gear set PG1 is converted according to the gear ratio of the first transfer gear set TF1, and the converted torque is input to the seventh shaft TM7 as inverse rotation speed. In addition, the torque of the fourth shaft TM4 is converted according to the gear ratio of the second transfer gear set TF2, and the converted torque is input to the sixth shaft TM6 as inverse rotation speed.

Therefore, the second planetary gear set PG2 outputs torque shifted by a difference between rotation speed of the seventh shaft TM7 and rotation speed of the sixth shaft TM6 through the fifth shaft TM5. Therefore, the vehicle can run at the fifth forward speed stage.

Figure 3:
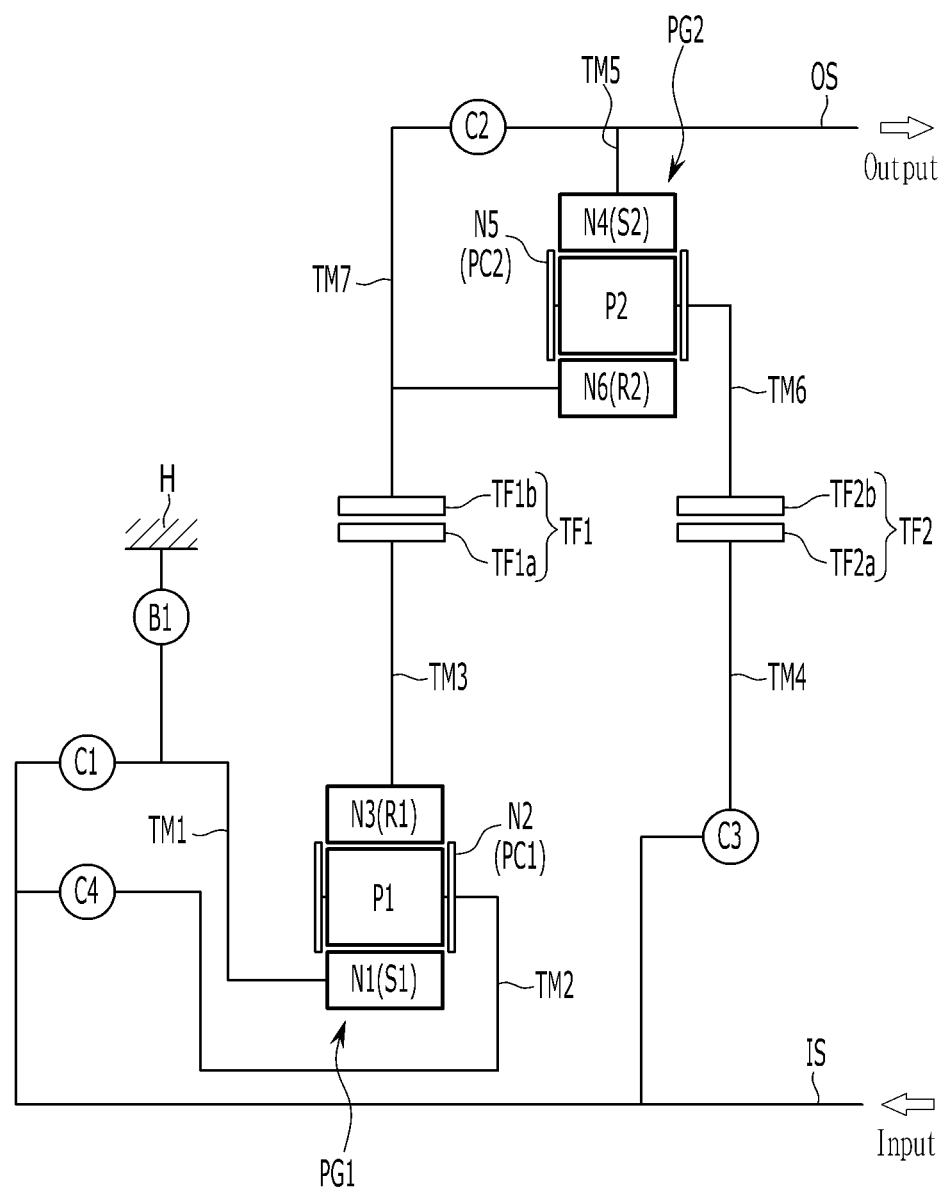
FIG. 3 is a schematic diagram of a planetary gear train according to the second exemplary form of the present disclosure.
Figure 4:
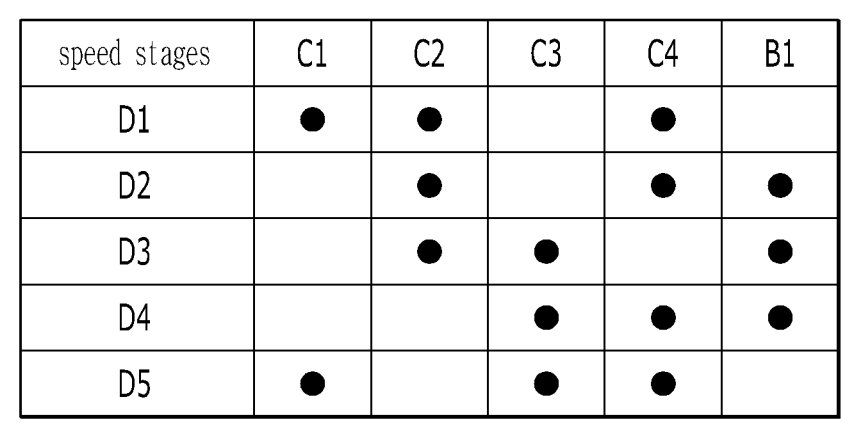

FIG. 3 is a schematic diagram of a planetary gear train according to the second exemplary form of the present disclosure, and FIG. 4 is an operation chart of engagement elements at each speed stage in the planetary gear train according to the second exemplary form of the present disclosure.

Referring to FIG. 3, the second shaft TM2 is selectively connected to the input shaft IS in the planetary gear train according to the second exemplary form of the present disclosure.

That is, the second shaft TM2 fixedly connected to the second rotation element N2 of the first planetary gear set PG1 is fixedly connected to the input shaft IS to be continuously operated as the input element in the first exemplary form of the present disclosure, but the second shaft TM2 fixedly connected to the second rotation element N2 of the first planetary gear set PG1 is selectively connected to the input shaft IS through the fourth clutch C4 to be operated as a selective input element in the second exemplary form.

As described above, the torque of the input shaft IS input to the second shaft TM2 does not affect shift at the third forward speed stage. Therefore, as shown in FIG. 4, the fourth clutch C4 is operated at the first forward speed stage, the second forward speed stage, the fourth forward speed stage, and the fifth forward speed stage other than the third forward speed stage. Meanwhile, the first brake B1 which does not affect shift may be pre-operated at the third forward speed stage in order to prepare shift to the fourth forward speed stage.

Figure 5:
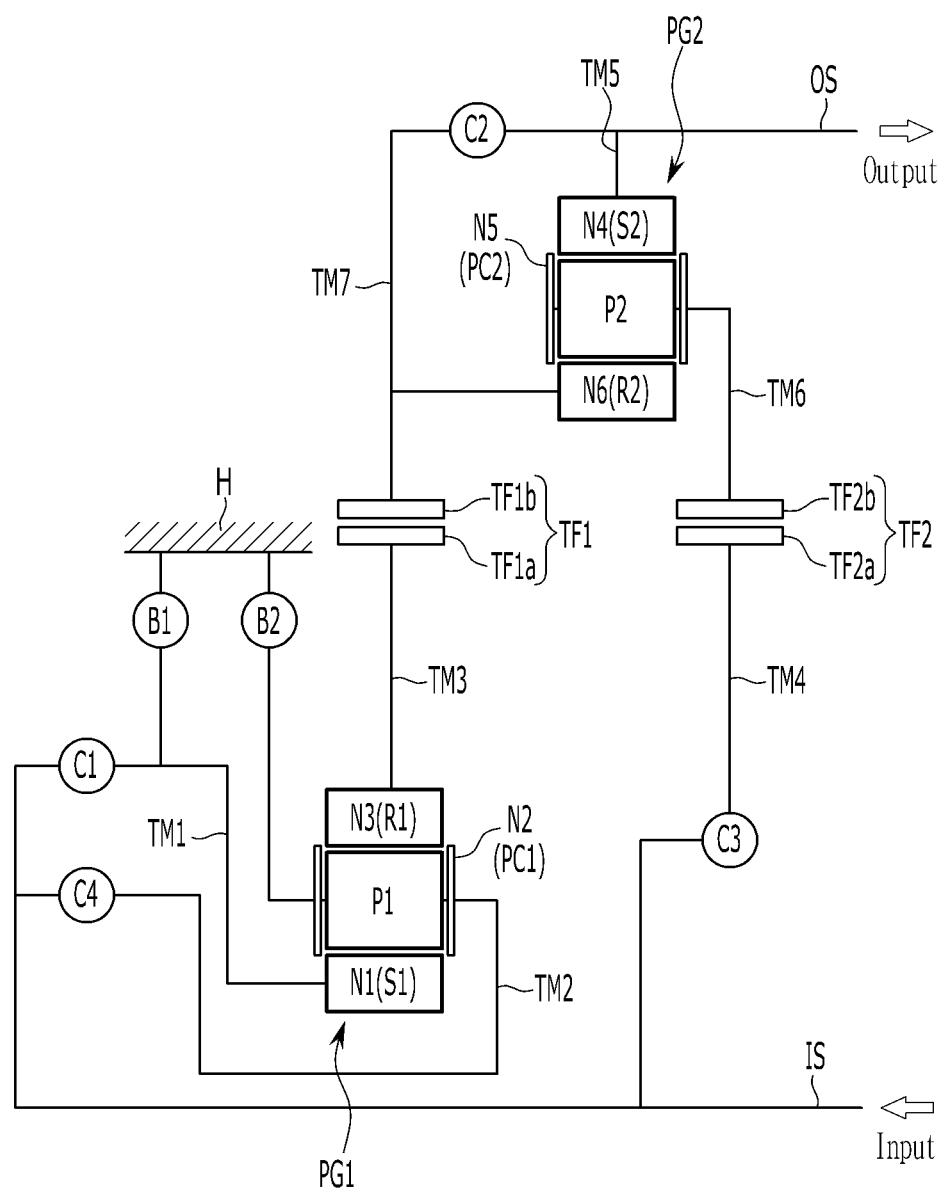
FIG. 5 is a schematic diagram of a planetary gear train according to the third exemplary form of the present disclosure.

FIG. 5 is a schematic diagram of a planetary gear train according to the third exemplary form of the present disclosure.

Referring to FIG. 5, the second shaft TM2 is selectively connected to the input shaft IS and a second brake B2 is additionally disposed between the second shaft TM2 and the transmission housing H in the planetary gear train according to the third exemplary form of the present disclosure.

That is, the second shaft TM2 fixedly connected to the second rotation element N2 of the first planetary gear set PG1 is fixedly connected to the input shaft IS to be continuously operated as the input element in the first exemplary form of the present disclosure, but the second shaft TM2 fixedly connected to the second rotation element N2 of the first planetary gear set PG1 is selectively connected to the input shaft IS through the fourth clutch C4 to be operated as a selective input element and is selectively connected to the transmission housing H through the second brake B2 to be operated as a selective fixed element in the third exemplary form. Therefore, the third exemplary form can achieve seven forward speed stages and one reverse speed stage.

FIG. 6 is an operation chart of engagement elements at each speed stage in the planetary gear train according to the third exemplary form of the present disclosure.

Referring to FIG. 6, three engagement elements among the first, second, third, and fourth clutches C1, C2, C3, and C4 and the first and second brakes B1 and B2 are operated at each speed stage in the planetary gear train according to the third exemplary form of the present disclosure. The planetary gear train according to the third exemplary form of the present disclosure can achieve seven forward speed stages and one reverse speed stage. Shifting processes will be described.

First Forward Speed Stage

The first, second, and fourth clutches C1, C2, and C4 are operated at the first forward speed stage D1.

In a state that the input shaft IS is connected to the first shaft TM1 by operation of the first clutch C1 and the input shaft IS is connected to the second shaft TM2 by operation of the fourth clutch C4, the torque of the input shaft IS is input to the first shaft TM1 and the second shaft TM2. Therefore, the first planetary gear set PG1 becomes the lock-up state.

In addition, the fifth shaft TM5 is connected to the seventh shaft TM7 by operation of the second clutch C2 such that the second planetary gear set PG2 also becomes the lock-up state.

Torque of the third shaft TM3 of the first planetary gear set PG1 is converted according to the gear ratio of the first transfer gear set TF1, and the converted torque is input to the seventh shaft TM7 as inverse rotation speed. The second planetary gear set PG2 outputs the torque input through the seventh shaft TM7 through the output shaft OS without rotation speed change. Therefore, the vehicle can run at the first forward speed stage.

Second Forward Speed Stage

The second and fourth clutches C2 and C4 and the first brake B1 are operated at the second forward speed stage D2.

In a state that the input shaft IS is connected to the second shaft TM2 by operation of the fourth clutch C4 and the first shaft TM1 is operated as the fixed element by operation of the first brake B1, the torque of the input shaft IS is input to the second shaft TM2. Therefore, the first planetary gear set PG1 outputs the torque with increased rotation speed through the third shaft TM3.

In addition, the fifth shaft TM5 is connected to the seventh shaft TM7 by operation of the second clutch C2 such that the second planetary gear set PG2 becomes the lock-up state.

The torque with increased rotation speed output through the third shaft TM3 of the first planetary gear set PG1 is converted according to the gear ratio of the first transfer gear set TF1, and the converted torque is input to the seventh shaft TM7 as inverse rotation speed. The second planetary gear set PG2 outputs the torque input through the seventh shaft TM7 through the output shaft OS without rotation speed change. Therefore, the vehicle can run at the second forward speed stage with a speed faster than at the first forward speed stage.

Third Forward Speed Stage

The second and third clutches C2 and C3 are operated at the third forward speed stage D3. At this time, the first brake B1 may be pre-operated for shift to the fourth forward speed stage.

In a state that the input shaft IS is connected to the fourth shaft TM4 by operation of the third clutch C3, the torque of the input shaft IS is input to the fourth shaft TM4.

In addition, the fifth shaft TM5 is connected to the seventh shaft TM7 by operation of the second clutch C2 such that the second planetary gear set PG2 also becomes the lock-up state.

The torque of the fourth shaft TM4 is converted according to the gear ratio of the second transfer gear set TF2, and the converted torque is input to the sixth shaft TM6 as inverse rotation speed. The second planetary gear set PG2 outputs the torque input through the sixth shaft TM6 through the output shaft OS without rotation speed change. At this state, rotation speed of the torque of the fourth shaft TM4 converted by the second transfer gear set TF2 at the third forward speed stage is larger than that of the torque of the third shaft TM3 converted by the first transfer gear set TF1 at the second forward speed stage. Therefore, the vehicle can run at the third forward speed stage with a speed faster than at the second forward speed stage.

Meanwhile, the first planetary gear set PG1 does not affect the third forward speed stage. The first and second shafts TM1 and TM2 run idle by the torque transmitted to the third shaft TM3 through the seventh shaft TM7.

Fourth Forward Speed Stage

The third and fourth clutches C3 and C4 and the first brake B1 are operated at the fourth forward speed stage D4.

In a state that the input shaft IS is connected to the second shaft TM2 by operation of the fourth clutch C4 and the first shaft TM1 is operated as the fixed element by operation of the first brake B1, the torque of the input shaft IS is input to the second shaft TM2. Therefore, the first planetary gear set PG1 outputs the torque with increased rotation speed through the third shaft TM3.

In a state that the input shaft IS is connected to the fourth shaft TM4 by operation of the third clutch C3, the torque of the input shaft IS is input to the fourth shaft TM4.

The torque with increased rotation speed output through the third shaft TM3 of the first planetary gear set PG1 is converted according to the gear ratio of the first transfer gear set TF1, and the converted torque is input to the seventh shaft TM7 as inverse rotation speed. In addition, the torque of the fourth shaft TM4 is converted according to the gear ratio of the second transfer gear set TF2, and the converted torque is input to the sixth shaft TM6 as inverse rotation speed.

Therefore, the second planetary gear set PG2 outputs torque shifted by a difference between rotation speed of the seventh shaft TM7 and rotation speed of the sixth shaft TM6 through the fifth shaft TMS. Therefore, the vehicle can run at the fourth forward speed stage.

Fifth Forward Speed Stage

The first, third, and fourth clutches C1, C3, and C4 are operated at the fifth forward speed stage D5.

In a state that the input shaft IS is connected to the first shaft TM1 by operation of the first clutch Cl and the input shaft IS is connected to the second shaft TM2 by operation of the fourth clutch C4, the torque of the input shaft IS is input to the first shaft TM1 and the second shaft TM2. Therefore, the first planetary gear set PG1 becomes the lock-up state.

In a state that the input shaft IS is connected to the fourth shaft TM4 by operation of the third clutch C3, the torque of the input shaft IS is input to the fourth shaft TM4.

The torque with increased rotation speed output through the third shaft TM3 of the first planetary gear set PG1 is converted according to the gear ratio of the first transfer gear set TF1, and the converted torque is input to the seventh shaft TM7 as inverse rotation speed. In addition, the torque of the fourth shaft TM4 is converted according to the gear ratio of the second transfer gear set TF2, and the converted torque is input to the sixth shaft TM6 as inverse rotation speed.

Therefore, the second planetary gear set PG2 outputs torque shifted by a difference between rotation speed of the seventh shaft TM7 and rotation speed of the sixth shaft TM6 through the fifth shaft TM5. Therefore, the vehicle can run at the fifth forward speed stage.

Sixth Forward Speed Stage

The third clutch C3 and the first and second brakes B1 and B2 are operated at a sixth forward speed stage D6.

The first shaft TM1 and the second shaft TM2 are fixed to the transmission housing H by operation of the first and second brakes B1 and B2 such that all the rotation elements of the first planetary gear set PG1 are stopped.

In a state that the input shaft IS is connected to the fourth shaft TM4 by operation of the third clutch C3, the torque of the input shaft IS is input to the fourth shaft TM4.

In this state, the seventh shaft TM7 operably connected to the third shaft TM3 through the first transfer gear set TF1 is also operated as the fixed element, torque of the fourth shaft TM4 is converted according to the gear ratio of the second transfer gear set TF2, and the converted torque is input to the sixth shaft TM6 as inverse rotation speed.

The second planetary gear set PG2 outputs torque converted by the seventh shaft TM7 operated as the fixed element and the torque input to the sixth shaft TM6 through the fifth shaft TM5. Therefore, the vehicle can run at the sixth forward speed stage.

Seventh Forward Speed Stage

The first and third clutches C1 and C3 and the second brake B2 are operated at a seventh forward speed stage D7.

In a state that the input shaft IS is connected to the first shaft TM1 by operation of the first clutch C1, the torque of the input shaft IS is input to the first shaft TM1. In a state that the second shaft TM2 is fixed to the transmission housing H by operation of the second brake B2 and the input shaft IS is connected to the fourth shaft TM4 by operation of the third clutch C3, the torque of the input shaft IS is input to the fourth shaft TM4.

Therefore, the first planetary gear set PG outputs torque with reduced rotation speed through the third shaft TM3 as inverse rotation speed.

The torque of the third shaft TM3 is converted according to the gear ratio of the first transfer gear set TF1, and the converted torque is input to the seventh shaft TM7 of the second planetary gear set PG2 as normal rotation speed.

In addition, torque of the fourth shaft TM4 is converted according to the gear ratio of the second transfer gear set TF2, and the converted torque is input to the sixth shaft TM6 as inverse rotation speed.

Therefore, the second planetary gear set PG2 outputs torque shifted by a difference between rotation speed of the seventh shaft TM7 and rotation speed of the sixth shaft TM6 through the fifth shaft TMS. Therefore, the vehicle can run at the seventh forward speed stage.

Reverse Speed Stage

The first and second clutches C1 and C2 and the second brake B2 are operated at a reverse speed stage REV.

In a state that the first shaft TM1 is connected to the input shaft IS by operation of the first clutch C1, the torque of the input shaft IS is input to the first shaft TM1. In addition, the second shaft TM2 is fixed to the transmission housing H by operation of the second brake B2.

The fifth shaft TM5 is connected to the seventh shaft TM7 by operation of the second clutch C2 such that the second planetary gear set PG2 becomes the lock-up state.

Therefore, the first planetary gear set PG outputs the torque with reduced rotation speed through the third shaft TM3 as inverse rotation speed.

The torque of the third shaft TM3 is converted according to the gear ratio of the first transfer gear set TF1, and the converted torque is input to the seventh shaft TM7 of the second planetary gear set PG2 as normal rotation speed.

The second planetary gear set PG2 outputs the torque input to the seventh shaft TM7 through the output shaft OS without rotation speed change. Therefore, the vehicle can run at the reverse speed stage.

Here, 'normal rotation' means rotation in the same rotation direction as that of the engine, and 'inverse rotation' means rotation in opposite rotation direction to the rotation direction of the engine.

The planetary gear train according to the exemplary forms of the present disclosure may reduce a length of the transmission and improve installability by dividedly disposing two planetary gear sets on the input shaft and the output shaft disposed in parallel with and spaced from each other.

In addition, optimum gear ratios may be set due to ease of changing gear ratios by using two transfer gear sets as well as the planetary gear sets. Since gear ratios can be changed according to target performance, starting performance may be improved. Therefore, a start-up clutch instead of a torque converter may be used.

In addition, the planetary gear train according to the exemplary forms of the present disclosure may improve power delivery performance and fuel economy by realizing more than five forward speed stages.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

B1, B2: first and second brakes
C1, C2, C3, C4: first, second, third, and fourth clutches
PG1, PG2: first and second planetary gear sets
N1, N2, N3, N4, N5, N6: first, second, third, fourth, fifth, and sixth rotation elements
S1, S2: first and second sun gears
PC1, PC2: first and second planet carriers
R1, R2: first and second ring gears
IS: input shaft
OS: output shaft
TM1, TM2, TM3, TM4, TM5, TM6, TM7: first, second, third, fourth, fifth, sixth, and seventh shafts

What is claimed is:

1. A planetary gear train of an automatic transmission for a vehicle, the planetary gear train comprising:
    an input shaft receiving a torque of an engine;
    an output shaft outputting a torque and disposed in parallel with the input shaft;
    a first planetary gear set including first, second, and third rotation elements and disposed on a radially outer side of the input shaft;
    a second planetary gear set including fourth, fifth, and sixth rotation elements and disposed on a radially outer side of the output shaft;
    a first shaft fixedly connected to the first rotation element and selectively connected to the input shaft and a transmission housing, respectively;
    a second shaft fixedly connected to the second rotation element and operably connected to the input shaft;
    a third shaft fixedly connected to the third rotation element;
    a fourth shaft selectively connected to the input shaft;
    a fifth shaft fixedly connected to the fourth rotation element and the output shaft;
    a sixth shaft fixedly connected to the fifth rotation element and operably connected to the fourth shaft; and
    a seventh shaft fixedly connected to the sixth rotation element, selectively connected to the fifth shaft, and operably connected to the third shaft.

2. The planetary gear train of claim 1, further comprising:
    a first transfer gear set disposed between the third shaft and the seventh shaft and operably connecting the third shaft to the seventh shaft; and
    a second transfer gear set disposed between the fourth shaft and the sixth shaft and operably connecting the fourth shaft to the sixth shaft.

3. The planetary gear train of claim 2, wherein the second shaft is fixedly connected to the input shaft.

4. The planetary gear train of claim 3, further comprising:
    three clutches, each selectively connecting one shaft to another shaft selected among the input shaft and the seven shafts; and
    a first brake selectively connecting the first shaft to the transmission housing.

5. The planetary gear train of claim 4, wherein the three clutches comprise:
    a first clutch disposed between the input shaft and the first shaft;
    a second clutch disposed between the fifth shaft and the seventh shaft; and
    a third clutch disposed between the input shaft and the fourth shaft.

6. The planetary gear train of claim 2, wherein the second shaft is selectively connected to the input shaft.

7. The planetary gear train of claim 6, further comprising:
    four clutches, each selectively connecting one shaft to another shaft selected among the input shaft and the seven shafts; and
    a first brake selectively connecting the first shaft to the transmission housing.

8. The planetary gear train of claim 7, wherein the four clutches comprise:
    a first clutch disposed between the input shaft and the first shaft;
    a second clutch disposed between the fifth shaft and the seventh shaft;
    a third clutch disposed between the input shaft and the fourth shaft; and
    a fourth clutch disposed between the input shaft and the second shaft.

9. The planetary gear train of claim 7, further comprising a second brake disposed between the second shaft and the transmission housing.

10. The planetary gear train of claim 1, wherein the first planetary gear set is a single pinion planetary gear, the first rotation element is a first sun gear, the second rotation element is a first planet carrier, and the third rotation element is a first ring gear, and
    wherein the second planetary gear set is a single pinion planetary gear, the fourth rotation element is a second sun gear, the fifth rotation element is a second planet carrier, and the sixth rotation element is a second ring gear.

* * * * *